United States Patent
Butler

[11] Patent Number: 6,154,199
[45] Date of Patent: Nov. 28, 2000

[54] HAND POSITIONED MOUSE

[76] Inventor: Craig L. Butler, 714 Oak Ridge Dr., Neosho, Mo. 64850

[21] Appl. No.: 09/060,796

[22] Filed: Apr. 15, 1998

[51] Int. Cl.[7] .................................................. G09G 5/08
[52] U.S. Cl. ........................... 345/167; 345/163; 345/158
[58] Field of Search ..................... 345/158, 163, 345/164, 167, 156; 341/20; 368/270; 600/595, 395

[56] References Cited

U.S. PATENT DOCUMENTS

| | | | |
|---|---|---|---|
| 2,397,978 | 4/1946 | Paulus et al. ................................ | 200/6 |
| 3,022,878 | 2/1962 | Seibel ........................................ | 197/19 |
| 4,414,537 | 11/1983 | Grimes ...................................... | 341/20 |
| 4,988,981 | 1/1991 | Zimmerman et al. ................... | 345/158 |
| 5,124,960 | 6/1992 | Miller et al. ............................. | 368/270 |
| 5,280,276 | 1/1994 | Kwok ...................................... | 345/167 |
| 5,444,462 | 8/1995 | Wambach ................................ | 345/158 |
| 5,488,362 | 1/1996 | Ullman et al. ............................ | 341/20 |
| 5,581,484 | 12/1996 | Prince ...................................... | 364/559 |
| 5,760,766 | 6/1998 | Auber et al. ............................. | 345/167 |
| 5,813,406 | 9/1998 | Kramer et al. ........................... | 600/595 |

FOREIGN PATENT DOCUMENTS

| | | | |
|---|---|---|---|
| 9218925 | 8/1992 | United Kingdom .............. | G06F 3/00 |
| 95/15547 | 8/1995 | WIPO ............................. | G09B 13/00 |

*Primary Examiner*—Steven J. Saras
*Assistant Examiner*—Fritz Alphonse
*Attorney, Agent, or Firm*—Richard J. Grundstrom

[57] ABSTRACT

A hand positioned mouse that functions as a computer input device. The hand positioned mouse has an article that is worn on the hand of a computer user. The article can be in the form of a glove, half glove, sleeve, bracket or other type of configurations that can be worn on and supported on the hand. A support, such as a socket, is attached to the side of the article. The support is positioned at a location adjacent to the thumb. A tracking ball is contained within the support or socket. Electronic sensors track the movement of the tracking ball. Electrical signals are produced according to the rotation of the tracking ball. At least one switch is contained on the article for providing switch functions of the mouse. The switch is located on a location corresponding to the palm. The electrical signal and the switching functions are transmitted to the computer by a connector cord or by radio waves. This configuration allows the computer user to keep both hands on the keyboard and eliminates the need to move the hand back and forth between the keyboard and the mouse. In addition, the hand positioned mouse of this invention is ideal for playing computer games and interacting with such services as web TV. This invention can provide mouse operations apart from the keyboard and does not require a table top or keyboard for operation.

14 Claims, 4 Drawing Sheets

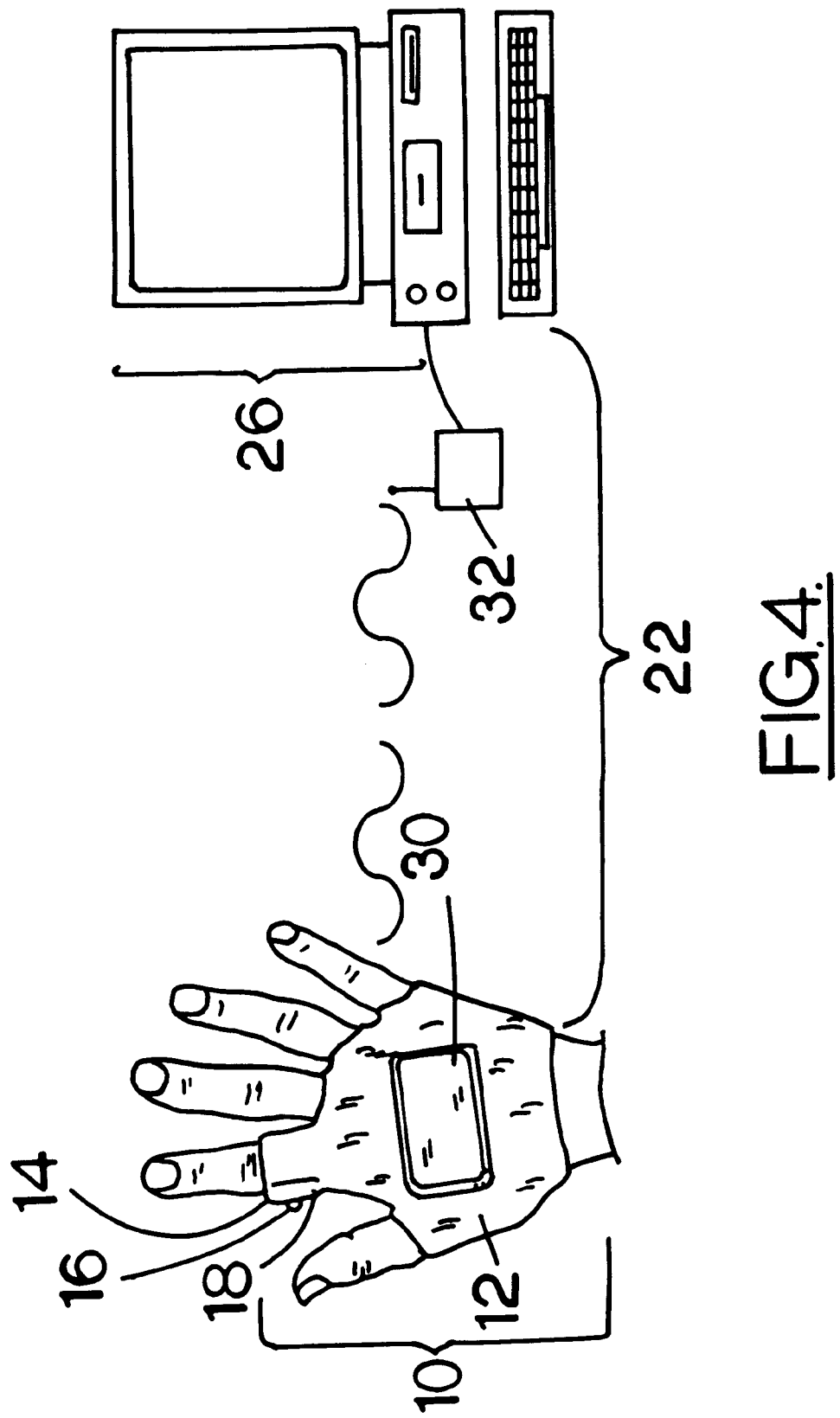

HAND POSITIONED MOUSE

BACKGROUND OF THE INVENTION

The present invention relates to a hand positioned mouse and more particularly to a computer mouse positioned on the hand of the user such that a tracking ball on the mouse can be operated by the thumb while keeping the fingers free to operate the computer keyboard and palm positioned mouse buttons.

A mouse is used as a computer input device. The mouse typically controls the location of a cursor on the monitors. In addition, there are typically two or three buttons for controlling switching functions of the mouse. The switching functions are usually used to activate a function or command identified by the cursor location. The switching functions can also be set up to control certain software features, such as highlighting in a word processor. There is a whole range of different functions which can be controlled by the switching function. It is hardware and software controlled.

The cursor location is controlled by movement of the mouse across a surface. As the mouse is moving the cursor moves in a similar manner. Within the mouse there is a tracking ball that rotates as the mouse is moved. Sensors within the mouse produce an electrical signal or pulse according to the rotation. The signal or pulse is relayed to the computer. The electrical signal or pulse causes the cursor to move accordingly. Several different sensing systems are known and used.

One draw back of a mouse is that one hand has to be removed from the keyboard to operate the mouse. The mouse has to be dragged across a surface, such as a table top or mouse pad. During this time the fingers cannot be used on the keyboard.

Some computer companies have tried to overcome this problem by locating a tracking ball right on the keyboard. Tracking balls have been placed in the center of the keyboard, off to one side or in front of the keyboard. These configurations help, but the fingers still have to be removed from the keyboard and moved from a typing position to a track ball position.

The present invention overcomes these disadvantages. The mouse or tracking ball is conveniently located and can be operated without moving the hand or removing the fingers from a typing position. This saves time and produces a very efficient means of simultaneous cursor control and typing. As such, this invention enables a computer user to complete tasks faster and easier. It is no longer necessary to keep moving one hand back and forth between the keyboard and the mouse or tracking ball. Both hands can be kept on the keyboard at all times.

Computer games and web TV are also getting very popular. Both often require cursor control with a mouse. As with the computer, the mouse must be dragged across a surface or the track ball has to be rotated. The present invention is ideal for these application. The track ball and switch functions are located on the hand to be completely free from a desk top or keyboard. This provides a more convenient means of playing a game or surfing the web while sitting in a chair or just sitting in front of the TV.

This invention can be used with any application requiring a mouse or track ball operation. As such, it is a universal product with a vast number of practical applications.

Accordingly, it is an object of the present invention to provide a hand positioned mouse adapted for universal use with most applications requiring a mouse or track ball operation.

Another object of the present invention is to provide a hand positioned mouse constructed to provide a very convenient means of implementation of cursor movement and switch functions. One of the principle advantages of this invention is the utilization of the dexterity of the thumb against the index finger for mouse or track ball operation.

A further object of the present invention is to provide a hand positioned mouse adapted for single hand operation of the mouse and switch function without moving the hand from the keyboard. This arrangement substantially reduces or eliminates the time of moving the hand between the keyboard and mouse or tracking ball.

Still another object of the present invention is to provide a hand positioned mouse that allows the hands to be maintained in a typing position while operating the mouse. Mouse operations are very conveniently located. Tracking ball operations are simply by thumb movement and switching function by a simple finger operation.

Still a further object of the present invention is to provide a hand positioned mouse adapted for use by computer based games and web operations. The hand positioned mouse of this invention is characterized by the ability to remove the mouse or track ball operations from the keyboard if desired. Since the operations are all within or on the hand, the mouse operation can be removed to allow a user to sit comfortably in front of a television without the need to have a keyboard present.

SUMMARY OF THE INVENTION

To accomplish the foregoing and other objects of this invention there is provided a hand positioned mouse and more particularly to a glove like article having a tracking ball positioned to be operated by the thumb with switch functions or buttons positioned on the palm of the hand.

Briefly the hand positioned mouse of this invention includes a glove like article positioned on a computer users hand, a tracking ball attached to the side of the article such that the tracking ball can be operated by the thumb, and switching functions positioned on the palm of the article such that they can be operated by a finger. A tracking means is used to monitor the movement of the tracking ball to control cursor location. A transmission means, such as a connector cord or radio transmitter, relays the electrical signals from the hand positioned mouse to the computer. A support means, such as a tracking ball socket, is attached to the article for supporting the tracking ball. The tracking means is typically contained within the support adjacent to the tracking ball.

All mouse operations are in the hand. As such the mouse operations can be used in conjunction with a keyboard operation or removed for a remote operation. The hand positioned mouse of this invention can be used as a control for computer games and for such applications as web TV.

The above mentioned and other objects and features of the present invention will be better understood and appreciated from the following detailed description of the main embodiment thereof, selected for purposes of illustration and shown in the accompanying drawings.

BRIEF DESCRIPTION OF THE DRAWINGS

FIG. 4 is a view showing a location for a radio transmitting means on the back side of the article of the hand positioned mouse and a representation of a transmitting means to a computer.

DETAILED DESCRIPTION

Figure 1:
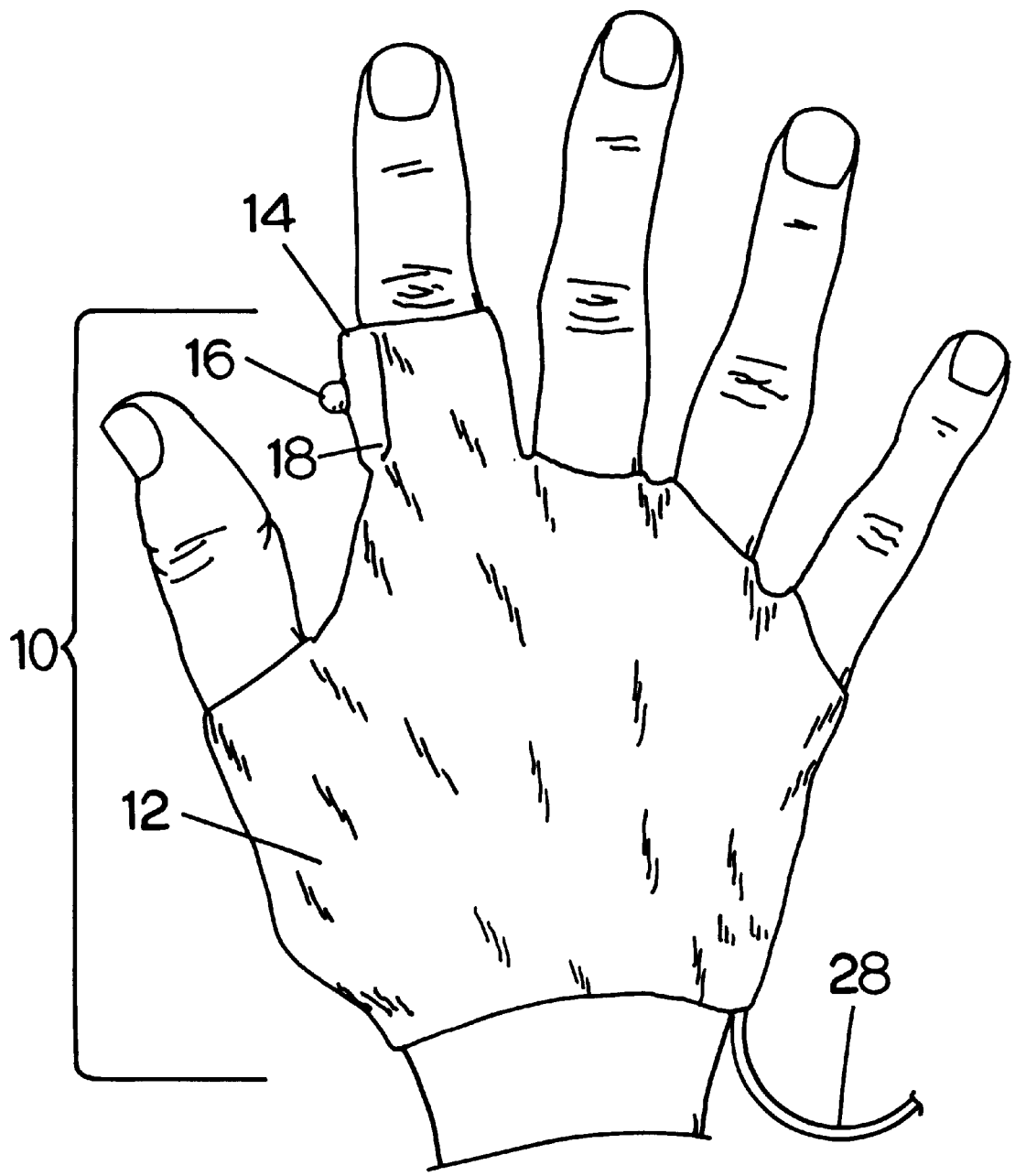
FIG. 1 is a top view of the hand positioned mouse on the hand of a computer user, showing the location of the tracking ball and support means.
Figure 2:
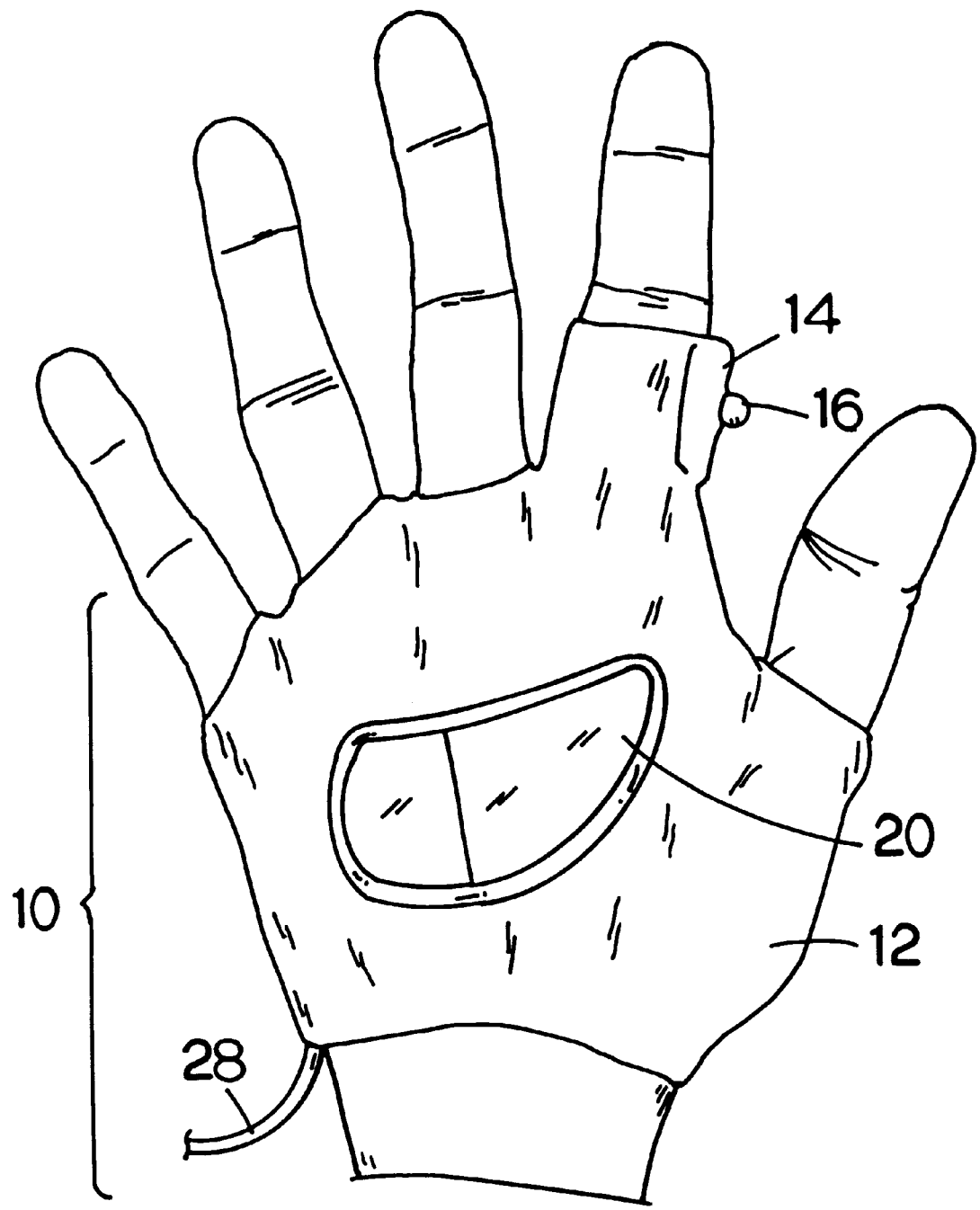
FIG. 2 is a bottom view showing the palm location of the switching means.

Referring now to the drawings in general there is shown a preferred embodiment for the hand positioned mouse 10 of this invention. In general terms, there is a glove like article 12 that has a tracking ball 16 attached to the side of the article such that the tracking ball 16 can be operated by the thumb. The mouse button(s) 20 is (are) positioned on the palm of the article 12. This places the buttons 20 on the palm to be operated by fingers as appropriate. In this manner, the tracking ball 16 can be operated while the fingers are free to use a computer keyboard and the button(s) 20 can be operated by any finger when needed. In addition, mouse operations are completely on or within the hand. As such mouse operations can be completely freed from the keyboard for such uses as computer games, web TV or other such uses.

The hand positioned mouse 10 of this invention basically has an article 12 which is placed on the hand of a computer user, a support means 14 attached to the article 12 at a position corresponding to the side of the pointer or index finger adjacent to a thumb, a tracking ball 16 supported within the support means 14, a tracking means 18 to generate an electrical signal in accordance with rotational movement of the tracking ball 16, at least one button means 20 on the article 12 to provide mouse electrical switching functions, and a transmission means 22 to transmit the electrical signal from the tracking means 16 and electrical switching functions from the button means 20 to a computer.

The preferred embodiment and the best mode contemplated of the hand positioned mouse 10 of the present invention are herein described. However, it should be understood that the best mode for carrying out the invention hereinafter described is offered by way of illustration and not by the way of limitation. It is intended that the scope of the invention include all modifications that incorporate its principal design features.

The article 12 can have any configuration from several different forms. All which will basically functions the same. In the preferred embodiment as shown, the article 12 resembles a glove like article. As shown, the preferred embodiment can be made from neoprene, elasticized mesh fabric or other suitable material. The article 12 or half glove slips over the fingers and hand. Fingers of the glove are removed for ease of typing. However, the length of the index or pointer finger as shown is somewhat longer for installation of the support means 14. As indicated above, the convenience of this invention is to free the hands from the mouse and to allow complete access to the keyboard. Thus, the fingers are removed for keyboarding. The hand can be held directly over the keyboard, with no time wasted moving the hands back and forth between keyboard and the mouse or other installed tracking ball.

A more rigid U-shaped article could also be configured (not shown) that just slides over the hand without finger holes. A sleeve configuration could also be used. Any practical configuration could be modified into an article consistent with the intent and within the scope of this invention. The principle considerations necessary for the article 12 would be the ability to fit onto a hand and to provide the support and location of the support means 14 and button means 22. Any configuration that would provide proper positioning and support for the support means 14 and the button means 20 could be used. In addition, both left hand and right hand models, in various sizes, may be available as needed or determined by the market forces. In some configurations, it might be possible to use a single configuration with either the right or left hand. Several different variations are possible and are considered within the scope and limitations of this disclosure.

The scope and limitations are to be determined by the scope of the claims and not by the discussions herein. Technology changes very rapidly and it is not the intent to define all possible present and future configurations of this invention. Nor is it possible to list all the applications within this document.

The support means 14 is typically attached to the article 12 at position near thumb contact with the adjacent finger. The principle purpose of this location is the utilization of the dexterity of the thumb against the pointer or index finger in moving the tracking ball 18. The tracking ball 18 is supported by the support means 14. As with most aspects of this invention, many variations are possible. Some variations are dependant on the supplier and availability of materials. Several components are readily available. It is just a matter of assembling the materials of choice.

In the preferred embodiment, the support means 14 is a tracking ball socket, also referred to as 14. The tracking ball 16 is held within the socket 14 with a portion of the tracking ball 16 remaining exposed. The exposed portion of the tracking ball 116 is operated upon or rotated by the thumb. As operated, the tracking ball 16 will rotate within the socket 14. The tracking ball 16 is typical in the art. It may be smooth and hard or somewhat soft depending on the manufacture and specific characteristics.

The tracking means 18 is used to generate an electrical signal at the tracking ball 16 rotates. Typically, the tracking means is will generate an X and Y axis electrical signal in accordance with the tracking ball 16 rotation. The signal is converted by the computer into an X-Y position of a cursor on the computer screen. Thus by operating the tracking ball 16 by the thumb, the cursor is easily positioned.

The button means 20 consists of one or more momentary contact switches. These momentary contact switches control all mouse function switching. The computer input mouse of almost all designs contains at least one button while most contain two. The hand positioned mouse 10 of this invention has similar functions. In the preferred embodiment, the button means 20 are located such that said button means 20 can be easily operated by a finger.

As illustrated and in the preferred embodiment, the button means 20 is located in the palm of the article 12. In this position, the button means can be easily operated using one finger. Since the buttons 20 are always present and conveniently located, switch function is very easy, convenient and fast. The hand does not have to leave the keyboard.

Figure 3:
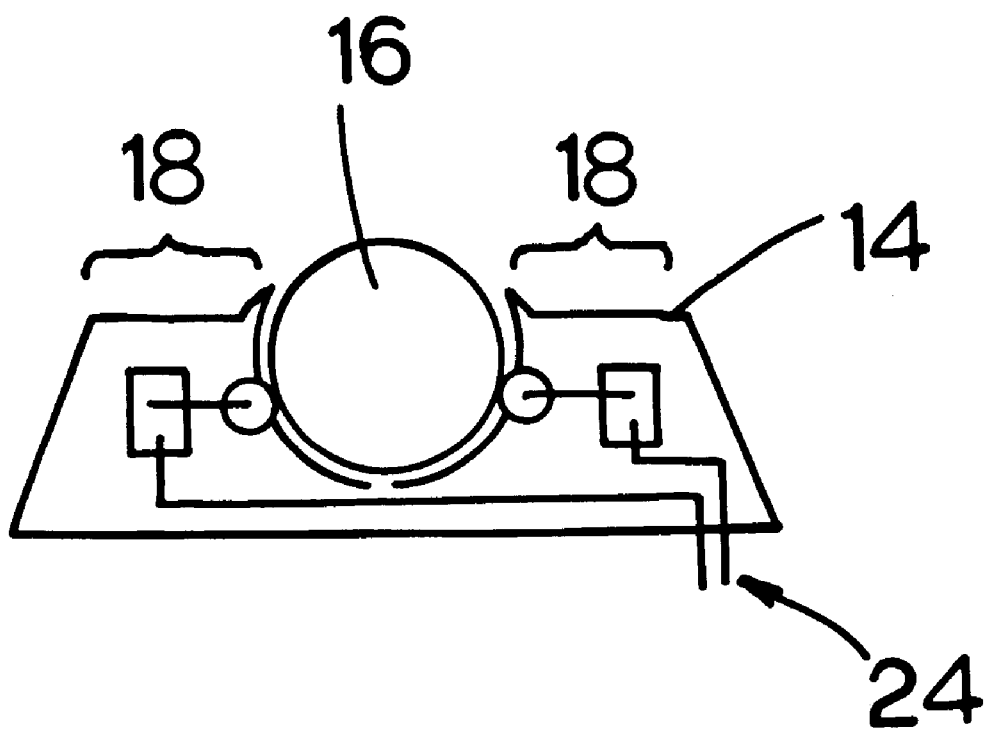
FIG. 3 is a section view of a typical support means, tracking means and tracking ball.

The transmission means 22 is used to communicate between the hand positioned mouse 10 and a computer. The signal generated from the tracking means and the switching functions from the button means 20 are relayed to the computer 26 via the transmission means 22. As shown and in the preferred embodiment, the transmission means 22 is a connector cord 28, having a plurality of conductors therein. The conductors are attached to the tracking means 18, at 24 FIG. 3, and to the button means 20. A plug or socket on the opposite end of the connector cord would plug into a computer port or other transmission means 22.

The transmission means 22 could also utilize a radio transmitter 30 connected to the tracking means 18 and to the button means 20. A radio receiver 32 would be attached to the input port on a computer 26. The transmitter 30 would transmit, via radio waves, the electrical signal and switching functions to the radio receiver 32 on the computer 26.

In operation the computer user would put the hand positioned mouse 10 on either the left or right hand as configured. This would place the tracing ball 16 in a position to be operated by thee thumb. The switching functions or buttons 20 are positioned on the palm of the hand. The transmitting means 22, whether via connector cord or by transmitter 30 and receiver 32, would be connected to the computer 26. In this manner, cursor control is by the thumb and switching functions are operated by pressing a button 20 on the palm. The fingers are free to type on the keyboard without the need to move the hand to a mouse or tracking ball. In addition, if the hand positioned mouse 10 is being used in conjunction with a computer game or being used on an application such as web TV the mouse functions are easily performed remote from the keyboard and free from a table top.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention is determined by the appended claims and their equivalents.

What is claimed is:

1. A hand positioned mouse operating as a computer input:. device comprising:
    an article means placed upon and onto a hand of a computer user;
    a support means attached to said article at a position corresponding to the side of a pointer or index finger adjacent to a thumb;
    a tracking ball supported within said support means on said article, in a position such that said tracking ball can be operated upon by the thumb;
    a tracking means to generate an electrical signal in accordance with rotational movement of said tracking ball;
    a button means on said article to provide mouse electrical switching functions; and
    a transmission means to transmit said electrical signal from said tracking means and electrical switching functions from said button means to a computer.

2. The hand positioned mouse as set forth in claim 1 in which said article means comprises a half glove.

3. The hand positioned mouse as set forth in claim 2 in which said half glove is made from neoprene or elastic mesh.

4. The hand positioned mouse as set forth in claim 1 in which said support means comprises a tracking ball receiving socket, said socket containing said tracking means to generate an electrical signal as said tracking ball rotates within said socket.

5. The hand positioned mouse as set forth in claim 1 in which said button means comprises one or more momentary contact switches.

6. The hand positioned mouse as set forth in claim 5 in which said momentary contact switches are attached to said article means in a location corresponding to the palm of the hand when being worn by a computer user.

7. The hand positioned mouse as set forth in claim 1 in which said transmission means comprises a connector cord having a plurality of conductors attached to said tracking means and to said button means and an opposite end of said connector cord being attachable to a computer.

8. The hand positioned mouse as set forth in claim 1 in which said transmission means comprises a radio transmission means connected to said tracking means and to said button means, and a radio receiving means attachable to a computer, said radio transmission means transmitting said electrical signal and switching functions to said radio receiving means.

9. A hand positioned mouse comprising
    a glove like article placed upon and worn on a hand of a computer user;
    a tracking ball socket attached to said article at a position corresponding to the side of a pointer or index finger adjacent to a thumb;
    a tracking ball supported within said support means on said article, such that said tracking ball can be operated upon by the thumb;
    tracking means located within said tracking ball socket to generate an electrical signal in accordance with rotational movement of said tracking ball;
    button means consisting of one or more momentary contact switches on said article to provide mouse electrical switching functions; and
    a transmission means to transmit said electrical signal from said tracking means and electrical switching functions from said button means to a computer.

10. The hand positioned mouse as set forth in claim 9 in which said transmission means comprises a connector cord having a plurality of conductors attached to said tracking means and to said button means and an opposite end of said connector cord being attachable to a computer.

11. The hand positioned mouse as set forth in claim 9 in which said transmission means comprises a radio transmission means connected to said tracking means and to said button means, and a radio receiving means attachable to a computer, said radio transmission means transmitting said electrical signal and switching functions to said radio receiving means.

12. A method of hand positioned mouse in which the steps comprise:
    providing an article that is worn on the hand;
    attaching a supporting means on a side location on said article;
    installing a rotatable tracking ball within said supporting means;
    providing a tracking means that produces an electrical signal in accordance with the rotation of said tracking ball;
    installing switching means on said article, said switching means having one or more momentary contact switches for controlling switch functions; and transmitting said electrical signal and switching functions from said hand positioned mouse to a computer.

13. The method of hand positioned mouse as set forth in claim 12 in which said step of transmitting said electrical signal and switching functions further comprises attaching a connector cord to said tracking means and to said switching means, attaching a plug on an opposite end of said connector cord to a computer and transmitting said electrical signal and switching functions through said connector cord.

14. The method of hand positioned mouse as set forth in claim 12 in which said step of transmitting said electrical signal and switching functions further comprises connecting said tracking means and said switching means to a radio transmitting means, attaching a corresponding radio receiving means to a computer and transmitting said electrical signal and switching functions by radio waves from said radio transmitting means to said radio receiving means.

* * * * *